US012591231B2

(12) United States Patent
Martins Santos et al.

(10) Patent No.: US 12,591,231 B2
(45) Date of Patent: Mar. 31, 2026

(54) METHOD FOR DETECTING OPERATIONAL FAILURES

(71) Applicant: Petróleo Brasileiro S.A.—Petrobras, Rio de Janeiro (BR)

(72) Inventors: Bruno Martins Santos, Rio de Janeiro (BR); Leonardo Fialho De Mello, Rio de Janeiro (BR); Leandro Borges Grimaldi Molleri, Rio de Janeiro (BR); Rodrigo Rosa Fernandes De Carvalho, Rio de Janeiro (BR); Diego Telles Fernandes, Rio de Janeiro (BR); Adriana De Souza Ferreira, Rio de Janeiro (BR); Luiz Eduardo Borges Dos Santos, Rio de Janeiro (BR); Vivian Passos De Souza, Rio de Janeiro (BR); Ludmila Ribeiro De Francisco, Araucária (BR)

(73) Assignee: Petróleo Brasileiro S.A.— Petrobras, Rio de Janeiro (BR)

( * ) Notice: Subject to any disclaimer, the term of this patent is extended or adjusted under 35 U.S.C. 154(b) by 447 days.

(21) Appl. No.: 18/082,001

(22) Filed: Dec. 15, 2022

(65) Prior Publication Data

US 2023/0195096 A1 Jun. 22, 2023

(30) Foreign Application Priority Data

Dec. 16, 2021 (BR) ...................... 10 2021 025514 5

(51) Int. Cl.
*G05B 23/02* (2006.01)

(52) U.S. Cl.
CPC ....... *G05B 23/024* (2013.01); *G05B 23/0221* (2013.01); *G05B 23/0267* (2013.01)

(58) Field of Classification Search
CPC .............. G05B 23/024; G05B 23/0221; G05B 23/0267
See application file for complete search history.

(56) References Cited

U.S. PATENT DOCUMENTS

2024/0127167 A1* 4/2024 Yang ...................... G06Q 10/04

FOREIGN PATENT DOCUMENTS

CN 108240884 B 4/2020
WO 2021023613 A1 2/2021

OTHER PUBLICATIONS

Rezvy et al., Investigation on the Role of Artificial Intelligence in Measurement System, May 30, 2025, IEEE Access, vol. 13, pp. 96483-96502, Digital Object Identifier 10.1109/ACCESS.2025. 3575164 (Year: 2025).*
Lim et al., "A Digital Twin Framework for Generation—IV Reactors with Reinforcement Learning-Enabled Health-Aware Supervisory Control", Jun. 9, 2025, pp. 1-39, arXiv:2506.17258v1 (Year: 2025).*
Pressure Drop in a Packed Bed Reactor, https://www.youtube.com/watch?v=toGV2wDJSag—Pressure Drop in a Packed Bed Reactor.
Rana et al. (2018) "Deposition of Fine Particles of Gas Oil on Hydrotreating Catalyst: Impact of Process Parameters and Filtration Trends", Fuel Processing Technology, 171:223-231.
Saih et al. (2009) "Catalytic Activity of Como Catalysts Supported on Boron-modified Alumina for the Hydrodesulphurization of Dibenzothiophene and 4,6-dimethyldibenzothiophene", Applied Catalysis A: General, 353(2):258-265.
Tsochatzidisa et al. (2002) "An Investigation of Liquid Maldistribution in Trickle Beds", Chemical Engineering Science, 57:3543-3555.
Usman et al. (2007) "Effect of Boron Addition on the Surface Structure of Co—Mo/Al2O3 Catalysts", Journal of Catalysis, 247:78-85.
Perez et al. (2019) "Avoiding Unplanned Reactor Shutdowns", Haldor Topsoe.

* cited by examiner

*Primary Examiner* — Mi'schita' Henson

(74) *Attorney, Agent, or Firm* — Morrison & Foerster LLP

(57) ABSTRACT

The present invention is related to the field of detection of operational failures, more specifically with the monitoring of head loss in equipment such as reactors, heat exchangers and adsorption vessels. The invention uses a method for continuous monitoring of equipment head loss, in order to assist in the early identification and action on this type of problem, avoiding or reducing losses resulting from its occurrence.

14 Claims, No Drawings

METHOD FOR DETECTING OPERATIONAL FAILURES

CROSS-REFERENCE TO RELATED APPLICATION

This application claims priority to Brazilian Application No. BR 10 2021 025514 5, filed on Dec. 16, 2021, and entitled "METHOD FOR DETECTING OPERATIONAL FAILURES," the disclosure of which is incorporated herein by reference in its entirety.

FIELD OF THE INVENTION

The present invention is related to the field of detection of operational failures, more specifically with high head loss in reactors and other process equipment. The invention uses a method for continuous monitoring the unit, but specifically the head loss of reactors, heat exchangers and adsorption vessels in order to assist in the early identification and action in case of a problem, avoiding or reducing the losses resulting from its occurrence.

DESCRIPTION OF THE STATE OF THE ART

The technical problem that motivated the invention was the need of monitoring the head loss of reactors and other process equipment to help oil refineries in the early identification and action on this type of problem, avoiding or reducing the resulting losses of its occurrence, more specifically in hydrotreatment reactors.

The quality of oils has gradually reduced over the years in terms of a decrease in its API and increases in the levels of contaminants (olefins, sulfur, nitrogenous, metals) and aromatics. Likewise, an increase in the yield of residual cuts is observed in relation to light distillates (naphtha) and medium distillates (kerosene and diesel). At the same time, environmental legislation intensifies quality restrictions with regard to limits on sulfur and aromatic content in fuels. The maximum sulfur content allowed in medium distillates is below 10 ppm (or mg/kg) in most industrialized countries (Usman et al., Effects of boron addition on the surface structure of Co—Mo/Al$_2$O$_3$ catalysts. Journal of Catalysis 247(2007) 78-85; Y. Saih and K. Segawa, Catalytic Activity of CoMo catalysts supported on boron-modified alumina for the hydrodesulphurization of dibenzothiophene and 4,6-dimethyldibenzothiophene, Applied Catalysis A: General 353(2009) 258-265). In addition, there is a greater restriction on the quality of diesel oil in relation to its density and cetane number. In face of this scenario, there is a large number of hydrotreatment units in operation and a continuous demand for the implementation of new units, which have become critical for the operation of the refineries. In this context, unscheduled shutdowns of hydrotreatment units can cause indirect effects throughout the refining chain and have a high cost for refineries, a situation that is intended to be avoided (PEREZ, M. J. L. et al., Avoiding unplanned reactor shutdowns. In hydroprocessing operations, prevention is better than just dealing with the effects of corrosion and fouling problems, Haldor Topsoe, 2019).

The hydrorefining reactions are generally conducted in Trickle-bed type reactors (dripping bed) in which the liquid and gas pass in co-current mode through the fixed bed of catalysts in order to remove impurities and saturate aromatics (Tsochatzidis, N. A. et al. An investigation of liquid maldistribution in trickle beds. Engineering Science 57 (2002) 3543-3555). Particles from corrosive processes or other contaminants can cause an increase in head loss in these reactors, blocking the passage of load in the catalytic bed. Considering the operating time of many of the hydroprocessing units, the presence of corrosive products is expected, in addition to possible more aggressive operating conditions and/or the type of processed loads (PEREZ, M. J. L. et al., Avoiding unplanned reactor shutdowns. In hydroprocessing operations, prevention is better than just dealing with the effects of corrosion and fouling problems, Haldor Topsoe, 2019).

There are two types of scenarios observed with the increase in head loss due to bed clogging. The first is when there is an accumulation of particles in the voids between the catalyst pellets in an approximately homogeneous manner, with the increase in head loss occurring in a continuous, relatively stable manner, and not configuring a problem in the short term. The second case is when contaminants are trapped in a relatively narrow layer between different grates. In this case, the head loss grows exponentially and is quite unpredictable, the hydraulic or mechanical limitations of the reactor are quickly reached and there is a need of resolving the issue quickly. This limit depends on the fraction of voids in the bed, but the problem becomes critical when the volume of voids is reduced to values between 20 and 25% of the original value, where from that point on there would be no return, and the unit shutting down in the short term would be inevitable. When this occurs, the possible options for prolonging the shutdown are admitting that the unit will operate with a loss of revenue by reducing the load flow rate or removing the catalyst layer from the top of the reactor when the problem is concentrated in this region (PEREZ, M. J. L. et al., Avoiding unplanned reactor shutdowns. In hydroprocessing operations, prevention is better than just dealing with the effects of corrosion and fouling problems, Haldor Topsoe, 2019).

The solution of using the most suitable filters and catalyst gradient in loading is known and extensively used, but does not prevent the problem from occurring. According to the work by PEREZ et al. (PEREZ, M. J. L. et al., Avoiding unplanned reactor shutdowns. In hydroprocessing operations, prevention is better than just dealing with the effects of corrosion and fouling problems, Haldor Topsoe, 2019), there are two options for dealing with the problem of increased head loss. In the first option, the production capacity of a hydrotreatment unit was reduced by 27,000 bbl/d after 470 days of operation, allowing the unit to operate more than 73 days with a processing loss of 386,000 bbl, which resulted in a loss of around €2.3 million. Thus, changing the operating condition is an artifice to extend the campaign time, but losses are accounted for with the reduction in processing capacity. Furthermore, in most cases, it is only possible to remain in this condition for a limited time. The second option, which can be considered after the problem has already settled, is skimming. This procedure consists of shutting down the unit and removing the part of the catalyst affected by head loss. Its duration may exceed 7 days, which would entail a loss of €910,000, in a conservative estimate, for a naphtha hydrotreatment unit of 15,000 b/d, according to the presented example. In this procedure, there is the possibility that part of the catalyst with problem remains in the reactor, which means that the head loss limits will be reached more quickly than if the catalyst were completely changed, remaining the unpredictability of the evolution of the head loss and the possibility of the problem occurring again. In this way, skimming does not solve the problem and, in addition, it may be necessary for the procedure to be carried out more than once to prolong the campaign.

Ranaa et al. (Ranaa, R. et al., Deposition of fine particles of gas oil on hydrotreating catalyst: Impact of process parameters and filtration trends. *Fuel Processing Technology* 171 (2018) 223-231) studied the effect of the parameters of process such as temperature and pressure in the clogging of the bed and increase of head loss. The drag of the load particles, specifically of gas oils derived from Athabasca bitumen, has sand or clay particles that adsorb an organic layer called asphaltene on the surface. Particles generally smaller than 20 µm enter the unit along with the load and are not retained by the guard bed filters. Even though they are present in low concentrations (on the order of 100-200 ppm), the prolonged exposure and high load flow rates lead to their accumulation, which may lead to an increase in load loss over time. The authors reported that the increase in bed temperature impacts deposition, either through the desorption of asphaltenes that migrate along the bed, or through increased coke formation that interacts with the fine aluminosilicates that cause greater deposition. In addition, it was observed that the deposition does not occur only physically, but also chemically, but at no time did the study indicate a solution to the problem.

Therefore, the documents of the state of the art report methods to estimate head loss in reactors; however, none of these documents suggest that the calculation of head loss can be used to reduce or eliminate operational losses in reactors or even other equipment from the areas of refining, natural gas and oil exploration and production. Furthermore, none of the anteriorities discloses or suggests a methodology to estimate a designed time for the reactor or process equipment to reach the head loss limit value. Therefore, the method proposed by the invention does not obviously arise to a technician skilled on the subject.

Document CN108240884B discloses a system for monitoring the head loss through a propylene ammonia feed distributor of a fluidized bed reactor for the amoxidation of acrylonitrile to produce acrylonitrile, in which the system consists of:

a first pressure measurement port located in the inlet line of the feed distributor close to the reactor wall;

a second pressure measurement port located on the reactor wall, between the air distribution plate and the end of the feed distributor nozzle;

a pressure data measurement unit between the first pressure measurement port and the second pressure measurement port; and a controller to which the measuring unit is connected via a signal line and to which the measured pressure data is transmitted, wherein the controller calculates a head loss of the feed distributor according to the pressure data transmitted by the measuring unit, thus determining whether the working state of the feed distributor is normal.

Document CN108240884B also discloses a method for monitoring the head loss of the propylene ammonia feed distributor of a fluidized bed reactor for amoxidation to produce acrylonitrile, which method steps are as follows:

providing a first pressure measurement port located on the feed distributor inlet line close to the reactor wall;

providing a second pressure measurement port located on the reactor wall between the air distribution plate and the end of the feed distributor nozzle;

measuring pressure data between the first pressure measuring port and the second pressure measuring port and transmitting the pressure data to a controller; and calculating the head loss of the feed distributor by the controller according to the pressure data, and judging whether the working status of the feed distributor is normal or not.

Document WO2021023613-A1 discloses a method to avoid the fluidization of a catalytic fixed bed present in a tubular reactor operated in an upward flow configuration, estimating a margin of head loss remaining before the fluidization of the catalytic bed and adjusting the flow of gas of the reactor in response.

The method has the following steps:

estimating a remaining head loss margin before the fluidization of the catalytic bed, wherein the head loss in the fluidization of the catalytic bed is:

$$DPcritical = Mcat \times g/S,$$

with Mcat being the mass of catalyst in the catalyst bed, g being the gravitational constant, S being the gas cross-sectional area through which the reactant gas flows in the catalyst bed, comprising the steps of:

i) calculation of the head loss in the fluidization of the catalytic bed, ii) measurement of the head loss of the DP bed between the upper and lower part of the catalytic bed, iii) determination of a head loss margin before fluidization, iv) adjust the reagent gas flow in response to the head loss margin.

The non-patent document (https://www.youtube.com/watch?v=toGV2wDJSag—PRESSURE DROP IN A PACKED BED REACTOR) discloses the calculation of head loss in a packed bed reactor, using the Ergun equation.

Unscheduled shutdowns always involve certain risks that bring losses to business, different types of temporary solutions and preventive monitoring allow reducing risks and uncertainties and improving the measurement of what happens to the reactor during the operating time (PEREZ, M. J. L. et al., Avoiding unplanned reactor shutdowns. In hydroprocessing operations, prevention is better than just dealing with the effects of corrosion and fouling problems, Haldor Topsoe, 2019).

The evolution of head loss during the campaign is intrinsic to HDT reactors, mainly due to the compaction of the catalytic bed and the formation of coke during the operation. In a normal situation, the evolution rate of head loss is low and does not compromise the operation of the unit. However, high values of this variable in the reactors cause a reduction in the processing capacity of the units and, in the most serious cases, make the flow inside the reactor unfeasible, leading to the need of shutting down to change the catalytic inventory, resulting in important production and revenue losses for refineries. Most of the time, the identification of the problem occurs when it is already in place and when there is not much to do. On the other hand, early detection would help minimize impacts. The evolution of head loss is not something easy to predict, as this variable is directly linked to the free area for flow inside the reactors (PEREZ, M. J. L. et al., Avoiding unplanned reactor shutdowns. In hydroprocessing operations, prevention is better than just dealing with the effects of corrosion and fouling problems, Haldor Topsoe, 2019), which is not possible to follow during the operation of the unit. In addition, there are no commercially available solutions for this type of analysis. In this way, the use of a method for continuous monitoring of head loss in reactors can help refineries in the early identification and action on this type of problem, avoiding or reducing the losses resulting from its occurrence.

Thus, the state of the art does not provide solutions capable of monitoring the head loss of reactors or even of process equipment such as heat exchangers or adsorption vessels to assist refineries or oil and natural gas production units in identifying early and action on this type of problem, avoiding or reducing the losses resulting from its occurrence.

Objective of the Invention

It is a first objective of the invention to provide a method of detecting operational failure from the continuous monitoring of reactors regarding head loss.

It is a second objective of the invention to provide a method for detecting operational failure from the continuous monitoring of heat exchangers and adsorption vessels regarding head loss.

It is a third objective of the invention to provide a method for detecting operational failure from the continuous monitoring of HDT reactors regarding head loss.

It is a fourth objective of the invention to avoid unscheduled shutdowns in reactors, heat exchangers and adsorption vessels or to minimize losses resulting from them.

BRIEF DESCRIPTION OF THE INVENTION

The operational failure detection method was developed to be applied to any process that benefits from plant monitoring, especially in cases where the evolution of the undesirable event cannot be mapped by known equations.

The method developed in the present invention can be used in various types of equipment, such as continuous flow reactors (plug flow—plug flow reactor), fluidized bed, dripping bed reactor, continuous stirred tank reactor (CSTR—continuous stirred tank reactor), vessels that are not reactors but have a porous bed inside and also heat exchangers; more specifically, for monitoring head loss in typical systems of the petroleum chain, such as reactors, heat exchangers and adsorption vessels existing in processes in the areas of exploration and production, refining (such as hydrotreatment, hydrocracking, fluid catalytic cracking (FCC), steam reforming, catalytic reforming, among others), petrochemicals and natural gas treatment units.

The adaptations for using the method in other chemical process plants can be carried out by any specialist in that field, it being only necessary to map the variables that must be observed and define the monitoring needs in terms of the acquisition interval, as well as the alarm settings that will depend on the dynamics of the process itself.

DETAILED DESCRIPTION OF THE INVENTION

There follows below a detailed description of a preferred embodiment of the present invention, by way of example and in no way limiting. Nevertheless, it will be clear to a technician skilled on the subject, from reading this description, possible additional embodiments of the present invention still comprised by the essential and optional features below.

The method for evaluating the head loss of equipment is described as follows:

1. calculating the current (from the plant) and limit (from the equipment design) normalized $\Delta P$ values from equation (1):

$$\Delta Pnormalized = (\Delta P) \times \left(\frac{W_{ref\ head}}{W_{head}}\right)^{1.89} \times \left(\frac{R_{gas/ref\ head}}{R_{gas/head}}\right)^{0.88}$$

2. calculating the evolution rate of the current normalized $\Delta P$, from the angular coefficient of the line of historical values;

3. calculating the moving average of current and limit normalized $\Delta P$s, using historical values;

4. designing the time for the unit to reach the normalized $\Delta P$ limit value, using the moving average values calculated in item 3 and the rate calculated in item 2, based on equations (2) and (3):

Time $\Delta P$ limit =

$$\frac{(\Delta P_{normalized\ limit\ (moving\ average)} - \Delta P_{current\ normalized\ (moving\ average)})}{rate},$$

and Date $\Delta P$ limit = (Time $\Delta P$ limit) + (current date);

5. calculating the remaining campaign time from Equation (4):

Remaining campaign time=(expected date of the end of the campaign)–(current date);

6. calculating R from Equation (5):

$$R = \frac{Time\ \Delta P\ limit}{Remaining\ campaign\ time};$$

7. issuing the alert level in the unit monitoring system.

The issuance of the alert level is given according to the following criteria:

a) Level 0—indication of level 0 on the day (Table 1)—no alert;

b) Level 1—Indication level 1 on the day (Table 1) and 80% indication "different from zero" in the last 20 days;

c) Level 2—Level 2 indication on the day (Table 1) and 80% "different from zero" indication in the last 14 days d) Level 3—Indication level 3 on the day (Table 1) and 80% indication "different from zero" in the last 7 days.

Historical values show the range of 10 to 100 days of operation, preferably 20 to 60 days of operation and more preferably in the last 45 days of operation.

Table 1 presents the alert levels, shown below.

TABLE 1

| Campaign Time | Remaining campaign time × R | | | | | | | |
| | R | | | | | | | |
| Remaining (days) | <0.25 | 0.25-0.33 | 0.33-0.4 | 0.4-0.5 | 0.5-0.7 | 0.7-1 | 1-1.5 | >1.5 |
| --- | --- | --- | --- | --- | --- | --- | --- | --- |
| <180 | 3 | 3 | 3 | 3 | 3 | 3 | 1 | 0 |
| 180-270 | 3 | 3 | 3 | 3 | 3 | 3 | 0 | 0 |
| 270-360 | 3 | 3 | 3 | 3 | 3 | 2 | 0 | 0 |
| 360-450 | 3 | 3 | 3 | 3 | 2 | 1 | 0 | 0 |
| 450-540 | 3 | 3 | 3 | 2 | 1 | 0 | 0 | 0 |
| 540-720 | 3 | 3 | 2 | 1 | 1 | 0 | 0 | 0 |
| >729 | 3 | 2 | 2 | 1 | 1 | 0 | 0 | 0 |

Key: 0—Normal situation; 1—minor problem; 2—medium problem; 3—severe problem.

EXAMPLES

The following examples are presented in order to more fully illustrate the nature of the present invention and the way to practice the same, without, however, being considered as limiting its content.

In the following examples, the methodology used to monitor head loss performed the daily monitoring of the evolution rate of this variable using historical data for the last 45 days. Next, the remaining time for safe operation of the unit was designed. The identification of the head loss problem occurs when the designed operating time is lower than the scheduled operating time. The method allows issuing an alert where it is most convenient, such as in the unit control system or if it exists in a unit monitoring system, so that the refinery engineering and operation can act on the unit in order to identify the cause(s) of the problem and seek to avoid losses resulting from the event. For cases where it is not possible to identify the cause(s) or the identified problem has no solution, the early detection promoted by the method allows the refinery to reduce the losses resulting from this event and prepare for a scheduled shutdown, which has a lower cost than an emergency shutdown.

Example 1

The diesel HDT (hydrotreatment) unit of refinery A, which has 5 reactors, operated with head loss values between 1.5 and 3.5 kgf/cm² (147.1 and 343.2 KPa) in each reactor and a total scheduled operating time of 2,200 days. After day 1,800, the first two reactors had head loss values above the historical average and a constant upward trend, reaching critical values for the unit operation after 1,950 days of operation. The methodology detected and signaled the problem from day 1790 of operation.

Example 2

The diesel HDT unit of refinery B, which has 3 reactors, operated with head loss values between 1.0 and 3.0 kgf/cm² (98.07 and 294.2 KPa) in each reactor and a total scheduled operating time of 1.110 days. After day 750, one of the reactors showed head loss values above the historical average and a constant upward trend, reaching critical values for the unit operation after 866 days of operation. The methodology detected and signaled the problem for the first time after 667 days of operation, returning to indicate a situation of normality a few days later. The second detection, definitively, occurred from day 735 of operation.

Example 3

The diesel HDT unit of refinery C, which has 4 reactors, operated with head loss values between 1.0 and 3.0 kgf/cm² (98.07 and 294.2 KPa) in each reactor and a total scheduled operating time of 2,169 days. After day 356, one of the reactors showed head loss values above the historical average and a constant upward trend, reaching critical values for the unit operation after 576 days of operation. The methodology detected and signaled the problem after 341 days of operation. In this case, the refinery team was unable to identify the causes of the problem, but using the developed method allowed the refinery to prepare for a scheduled shutdown. Without using the method, the refinery would identify the problem when it was already in a serious situation and the unit would be shut down on an emergency basis, resulting in greater disbursement by the refinery.

The invention claimed is:

1. A method for detecting operational failures, wherein the method comprises:

calculating current from a plant and limit from an equipment design normalized equipment head loss values from equation (1):

$$\Delta Pnormalized = (\Delta P) \times \left(\frac{W_{ref\ head}}{W_{head}}\right)^{1.89} \times \left(\frac{R_{gas/ref\ head}}{R_{gas/head}}\right)^{0.88}$$

wherein $\Delta$Pnormalized is normalized head loss, $\Delta$P is measured head loss, $W_{ref\ head}$ is reference head flow rate, $W_{head}$ is current head flow rate, $R_{gas/ref\ head}$ is reference gas constant, and $R_{gas/head}$ is current gas constant;

calculating an evolution rate of the current normalized $\Delta$P, from an angular coefficient of a line of historical values;

calculating a moving average of current and limit normalized $\Delta$Ps, using historical values;

designing a time for the equipment to reach the normalized $\Delta$P limit value, using the moving average values calculated and the evolution rate calculated, based on equations (2) and (3):

Time $\Delta P$ limit =

$$\frac{(\Delta P_{normalized\ limit\ (moving\ average)} - \Delta P_{current\ normalized\ (moving\ average)})}{rate},$$

and Date $\Delta P$ limit = (Time $\Delta P$ limit) + (current date)

wherein $\Delta P_{normalized\ limit\ (moving\ average)}$ is limit normalized head loss moving average, $\Delta P_{current\ normalized\ (moving\ average)}$ is current normalized head loss moving average, rate is evolution rate, Time $\Delta P$ limit is predicted time to reach limit, and Date $\Delta P$ limit is predicted date of reaching limit;

calculating a remaining campaign time from Equation (4):

Remaining campaign time=(expected date of the end of the campaign)−(current date);

calculating R from Equation (5):

$$R = \frac{Time\ \Delta P\ limit}{Remaining\ campaign\ time}$$

wherein R is risk ratio;

issuing an alert level based on R; and based on the issued alert level, taking action on or scheduling shutdown of the equipment.

2. The method of claim 1, wherein the method calculates the evolution rate of the current normalized $\Delta$P from the angular coefficient of the line of historical values between 10 and 100 days.

3. The method of claim 2, wherein the method calculates the evolution rate of the current normalized $\Delta$P from the angular coefficient of the line of historical values between 20 and 60 days.

4. The method of claim 3, wherein the method calculates the evolution rate of the current normalized $\Delta$P from the angular coefficient of a straight line of historical values in an interval of the last 45 days.

5. The method of claim 1, wherein the method calculates the moving average of the current and limit normalized ΔPs between 10 and 100 days.

6. The method of claim 5, wherein the method calculates the moving average of the current and limit normalized ΔPs between 20 and 60 days.

7. The method of claim 6, wherein the method calculates the moving average of the current and limit normalized ΔPs in an interval of the last 45 days.

8. The method of claim 1, wherein the alert level has the following alert levels: Level 0—indication of level 0; Level 1—Level 1 indication and 80% "different from zero" indication in the last 20 days; Level 2—Level 2 indication on the day and 80% "different from zero" indication in the last 14 days; Level 3—Level 3 indication on the day and 80% "different from zero" indication in the last 7 days.

9. The method of claim 1, wherein the alert level is available in a unit control system or in a unit monitoring system.

10. The method of claim 1, wherein the equipment is selected from reactors, heat exchangers, and adsorption vessels with porous beds.

11. The method of claim 10, wherein the reactors are selected from fluid catalytic bed reactors, dripping bed reactors, continuous flow reactors, and continuous stirred tank reactors.

12. The method of claim 11, wherein the fluid catalytic bed reactors are fluid catalytic cracking reactors.

13. The method of claim 11, wherein the dripping bed reactors are hydrotreatment reactors.

14. The method of claim 10, wherein the equipment is selected from reactors, heat exchangers and adsorption systems in oil exploration and production areas, and natural gas processing and petroleum refining units.

* * * * *